Aug. 24, 1954   J. R. SCHUCHARDT   2,686,948
RELEASABLE SLIDER FOR SLIDE OPERATED FASTENERS
Filed April 17, 1952   2 Sheets-Sheet 1
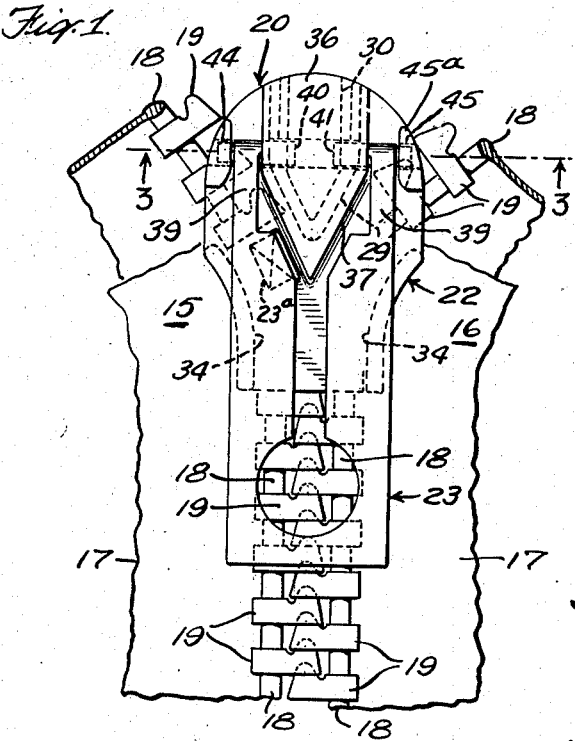
Fig. 1.
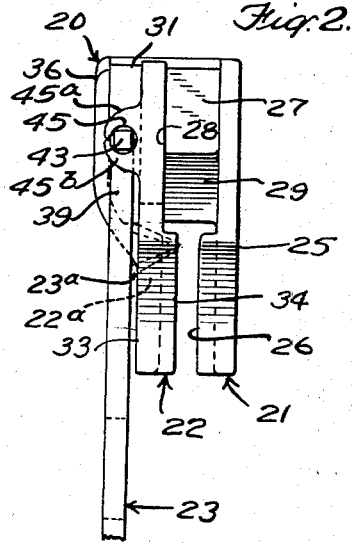
Fig. 2.
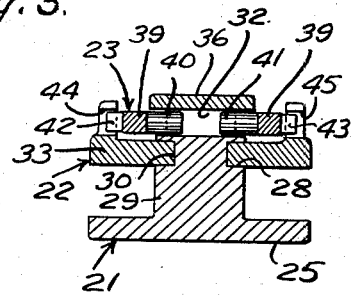
Fig. 3.
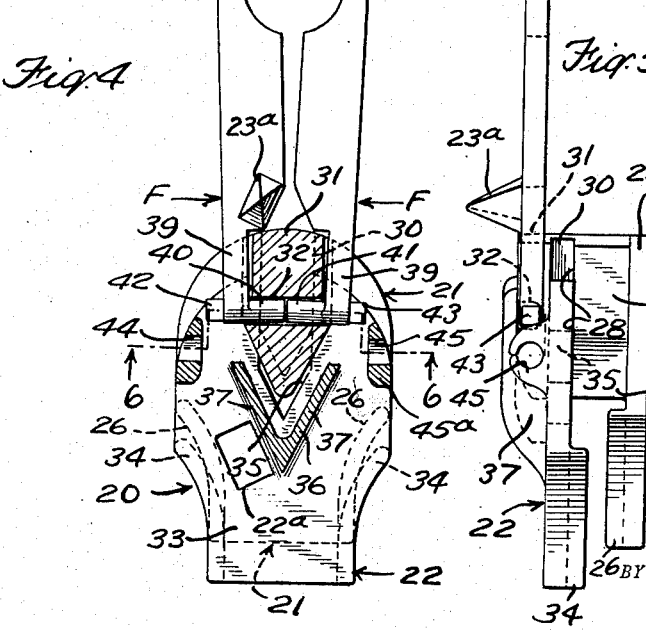
Fig. 4.
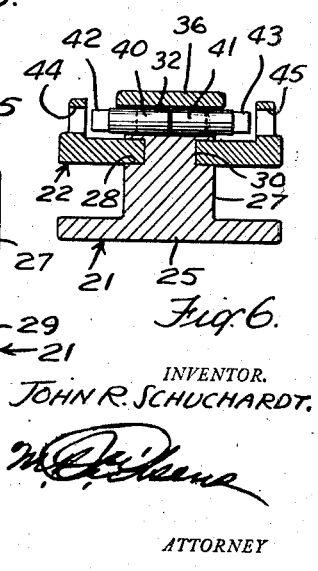
Fig. 5.
Fig. 6.
INVENTOR.
JOHN R. SCHUCHARDT.
ATTORNEY

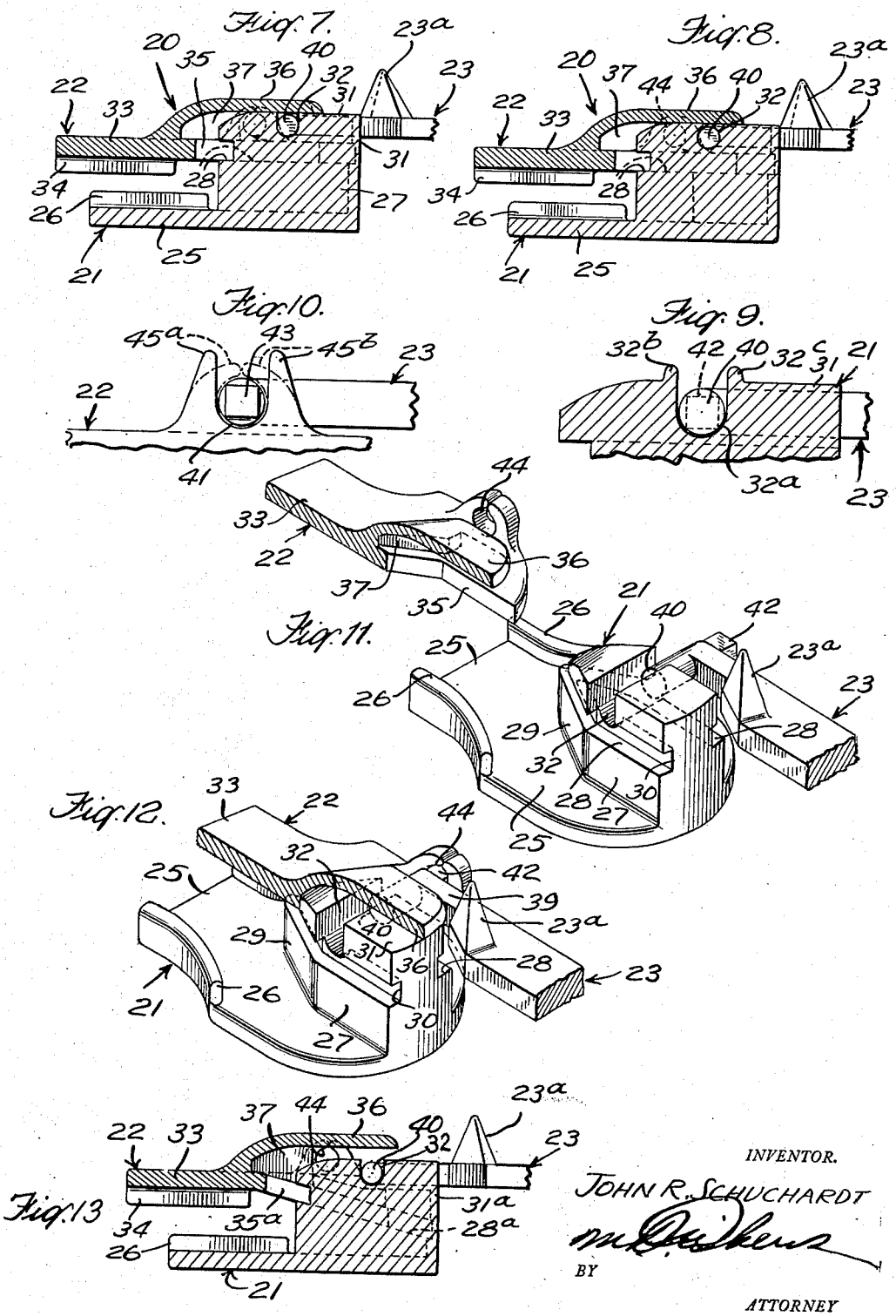

Patented Aug. 24, 1954

2,686,948

UNITED STATES PATENT OFFICE 2,686,948

RELEASABLE SLIDER FOR SLIDE OPERATED FASTENERS

John R. Schuchardt, Bayside, N. Y., assignor to Dollin Co., Irvington, N. J., a corporation of New Jersey Application April 17, 1952, Serial No. 282,760

8 Claims. (Cl. 24—205.15)

This invention relates to slide operated fasteners and, in particular, to the provision of a new and improved slider of extreme simplicity, strength and ease of operation, which slider normally closely engages, confines and guides the complementary fastener in predetermined relation for engagement and disengagement effected through longitudinal movement of the slider with respect thereto but which slider may be readily and conveniently selectively released or loosened with respect to the fastener members upon the occurrence of "catching," jamming or untracking of the slider for effecting release from the obstruction to its free movement or for its total removal from the fastener whereafter it may be restarted or replaced on the fastener at the lower ends of the fastener members.

It is an object of this invention to provide such a slider comprising complementary wings or wing members and a simple planar or plate-like pull tab or member provided with integral means cooperating with means provided on the wings or wing members normally to maintain the wings or wing members locked in predeterminedly spaced operative relation but readily and conveniently operable to release the wings or wing members from the aforesaid locked position for release of, or removal from, fastener members confined and guided therebetween upon the occurrence of catching, jamming or untracking of the slider.

It is a further object of this invention to provide such a slider wherein the aforesaid means on the pull tab or member comprises an integral yielding bifurcated inner end portion terminating in transverse trunnion means yieldingly manually movable axially to release the wings or wing members from the aforesaid locked position.

It is a further object of this invention to provide such a slider wherein the means cooperating with the trunnion means of the slider includes means for inhibiting free movement of the pull tab or member about its axis to prevent objectionable dangling thereof and/or accidental unlocking of sliders wherein the pull tab or member is provided with a conventional fastener member engaging locking pin or member.

It is a further object of this invention to provide such a slider wherein the trunnion means normally engages complementary apertures or recesses in portions of the front and rear wings or wing members which are aligned in the locked position of the wings and which are maintained in such position by extension of the trunnion means thereinto jointly, and which may be released from the aforesaid locked position only by withdrawal of the trunnion means from the aperture or recess means in one wing or wing member.

It is a further object of this invention to provide such a slider wherein the wings or wing members are keyed or splined together to provide extreme rigidity in the slider body formed thereby in their locked position by reason of the substantial areas of engagement provided by the keyed or splined connection of the wings.

These and other objects and advantages of the invention will appear from the following description taken with the drawing, which forms a part thereof, and will be pointed out in the appended claims.

In the drawing:

Fig. 1 is a front plan view illustrating the application of one preferred form of separable slider according to this invention to one conventional form of slider operated separable fastener with interdigitating fastener members or "scoops" commonly known as a "zipper," with the parts in "locked" position;

Fig. 2 is a side elevation of the slider shown in Fig. 1 with the pull tab, bail or handle cut away in the interest of convenience;

Fig. 3 is a transverse section, in elevation, taken substantially along the plane indicated by the line 3—3 in Fig. 1;

Fig. 4 is a front plan view of the slider of Fig. 1, but with the bail or pull tab in extreme unlocking position and the slider wings partly separated, with the pull tab cut away as in Fig. 2, with certain parts in section;

Fig. 5 is a view similar to Fig. 2 of the structure in the position of Fig. 4;

Fig. 6 is a view similar to Fig. 3, but taken substantially along the plane indicated by the line 6—6 in Fig. 4;

Fig. 7 is a longitudinal section, in elevation, taken substantially on the plane indicated by the line 7—7 in Fig. 4;

Fig. 8 is a view similar to Fig. 7 but showing a modification of the structure shown in Figs. 1–7 wherein the pull tab is permanently connected to the rear slider wing to form a unit;

Fig. 9 is a fragmentary view, in section, illustrating one manner in which the pull tab may be pivotally connected permanently with the rear slider wing by forming a closed recess or bore to support the pull tab trunnions for rotation and axial movement;

Fig. 10 is a view generally similar to Fig. 9 but in elevation and illustrating one manner in which pull tab supporting lugs may be conveniently formed on the slider front wing;

Fig. 11 is an exploded isometric view of the structure shown in Figs. 1–7 with the front wing and pull tab cut away, and partly in section.

Fig. 12 is an isometric view, partly in section and partly broken away, of the structure of Fig. 11 assembled, and with the parts, with the exception of the pull tab, in the position thereof shown in Figs. 1–3; and Fig. 13 is a view similar to Fig. 8, but showing a modification wherein the plane of the spline or key connection between the wings or wing members is inclined with respect to the planes of the wings or wing members.

Referring to the drawing in detail and with particular reference to Fig. 1, the slide operated separable fastener shown fragmentarily therein comprises a pair of complementary stringers generally designated 15 and 16 and each formed by a tape 17 with a beaded or otherwise reinforced edge 18 supporting a row of predeterminedly spaced interdigitating fastener members or "scoops" 19 which support the slider, generally designated 20, for longitudinal movement thereon, in opposite directions, for progressively engaging and disengaging the scoops 19 in conventional manner to close and open the fastener.

As shown particularly in Figs. 11 and 12, the slider 20 is formed by only three parts, namely the rear wing or wing member generally designated 21, the front wing or wing member 22, and the pull tab, bail or handle member 23 which normally connects the rear and front wings or wing members 21 and 22 rigidly together, but which may be manually actuated or mainpulated, as will hereinafter appear, to release the rear and front wings or wing members 21, 22 for relative longitudinal sliding movement. This permits release of the slider 20 from the fastener stringers 15 and 16 when jammed stuck, untracked or caught in the stringers or components thereof, or with objects or materials connected with the stringers 15 and/or 16 as shown particularly in Figs. 4–8, and 11. In extreme cases, complete separation of the rear and front wings 21 and 22 may well be desirable and may be readily and conveniently effected as shown in Figs. 4–8, 11 and 12.

The rear wing or wing member 21 comprises a planar or plate-like portion 25 having its side edges bounded at its lower end by forwardly projecting, upwardly diverging fastener member guiding side flanges 26. Extending forwardly from the upper end of this plate-like portion 25 is an integral stepped neck or neck member formed by a block or boss member or portion forming a pentagonal wedge 27 adjacent the planar portion 25 which terminates upwardly in a step 28 extending about the lower and side edges of the wedge 27. The inclined lower or side surfaces of the wedge 27 are designated 29 (Fig. 5) and cooperate with the side flanges 26 and corresponding side flanges on the front wing 22 (hereinafter described) to form an upwardly diverging channel in which the fastener members comprising complementary rows of scoops 19 of the stringers 15 and 16 are confined in known manner. Leading upwardly from the step 28, described above, is a similar portion of reduced size and of section similar to that of the wedge 27 which is designated 30. This portion 30 cooperates with the head portion 31 which is also non-circular or preferably of pentagonal section, as are the portions 27 and 30, to form a groove or spline disposed longitudinally of the front wing 22 for cooperation with a complementary slot or slot portion 35 of the front wing 22 as will be hereinafter described.

The head portion 31 is provided with a transverse channel 32 intermediate its length which channel supports the trunnions of the pull tab or member 23 as will hereinafter appear and as shown in Figs. 11 and 12.

The front wing or wing member 22 comprises a planar portion 33 of shape similar to that of the above described portion 25 of the rear wing or wing member 21 and the lower side edges thereof are provided with side flanges 34 aligned with and corresponding with the above described side flanges 26 toward which they extend and which side flanges 34 cooperate as described above, with the side flanges 26 and wedge surfaces 29 to form the upwardly diverging fastener member confining guide channel between the wings 21 and 22. Centrally of the plate-like portion 33 the wing 22 is provided with a non-circular or preferably pentagonal slot 35 which is complementary with the spline formed by the above described step 28, portion 30, and head portion 31 with which spline it cooperates for providing firm or rigid detachable connection of the wings 21 and 22 as will hereinafter appear.

Extending over the slot or aperture 35 and spaced therefrom to accommodate the head portion 31 is a cap 36 having its side walls 37 cut away upwardly of the channel 32 in the assembled position of the wing as indicated in Figs. 7 and 8 in order to permit sliding relative movement between wings 21 and 22, as shown in Figs. 4–8 and 11, when the pull tab or member 23 is in released position as shown in those views. As will readily appear from the drawing, the splined connection between the wings 21 and 22 provides very substantial engaging bearing surfaces or surface contact when the wings 21 and 22 are in their normal, locked, position (Figs. 1–3, 12) to insure that they are firmly and rigidly maintained parallel and in longitudinal and transverse alignment with the side flanges 26, 26 and 34, 34 opposed and aligned as shown in Figs. 1, 2 and 12.

As shown in the drawing, the elongated planar or plate-like pull member or pull tab 23 is slotted throughout a substantial portion of its length from its inner end in order that the legs or furcations 39 at its inner end may be readily compressed transversely by squeezing pressure exerted adjacent thereto as indicated at F–F in Fig. 4. These legs or furcations 39 terminate in similar oppositely directed or opposed trunnions or trunnion portions 40 and 41 which extend through the cut away portions of the side walls 37 of the cap 36 and have their inner end portions supported for free rotation and yielding axial movement toward one another in the above described channel 32 in the head portion 31 of the rear wing 21.

As shown in Figs. 1, 2, 3 and 12, the side walls 37 of the cap 36 prevent inward movement of the trunnions 40 and 41 in the channel 32 axially thereof unless the legs or furcations 39 are aligned with the cut away portions of the side walls 37 as shown in Figs. 4–8, 11 and 12. This insures that accidental unlocking of the slider parts from the position of Figs. 1, 3 and 12 shall not occur, because in the normal operation of a slider, the extreme position of the pull tab or pull member 23 shown in Figs. 4–8, 11 and 12 is but rarely, if ever encountered.

While the above described pivotal connection of the pull member 23 to the rear wing 21 insures its normal performance of the function of a conventional pull tab, it also performs a second function in releasably locking the wings 21 and 22 in the positions of Figs. 1–3 and 12 by reason of the trunnion extension members 42 and 43 which extend outwardly in opposite directions beyond the above described legs of furcations 39 of the pull member 23, and which are preferably coaxial with the trunnions 40 and 41. Although it is not necessary, these trunnion extensions 42 and 43 are preferably of non-circular section as shown. In their normal positions, as shown in Figs. 1–3 and 12, these trunnion extensions are supported and clampingly engaged by the trunnion extension supporting lugs generally designated 44 and 45 in Figs. 1–3, 7, 8 and 12.

As shown in Fig. 10, wherein the formation of the lug 45 is illustrated, these lugs may be formed of projections 45a and 45b extending upwardly from the plate-like portion of the wing 22 which are thereafter clamped inwardly together as shown in dash line in such manner as to form yielding closed channels or recesses supporting the trunnion extensions 42 and 43 for free axial movement by compression of the pull tab 23 as shown in Figs. 4–8 but with sufficient resistance to free rotation as to maintain the pull tab against accidental displacement from the locking position shown in Fig. 1 wherein the locking pin or projection 23a projects through aperture 22a into locking engagement with the fastener members in the slider channel as shown in Figs. 1 and 2.

Where, as in some cases, the locking projection 23a is omitted, this resistance to free rotation of the pull tab will prevent objectionable clashing or dangling of the pull members or pull tabs of slide fasteners incorporated in garments at the sleeve, etc.

When desired, the pull tab 23 may be secured to the head portion 31 of the rear wing 21 in such manner as to be retained therewith when the front wing 22 is separated therefrom as shown in Fig. 11; in such cases, the height of the head portion 31 may be increased and a crossbore substituted for the above described channel 32 with corresponding variation of the height of the cap 36 as shown in Fig. 8.

For convenience, and alternatively, this feature may be achieved by providing a pair of upwardly directed projections 32b and 32c as shown in Fig. 9 which may be bent over toward one another to confine the trunnions 40 and 41 in the closed channel or recess 32a formed thereby.

In the normal operation of the slider 20, the wings 21 and 22 are maintained locked in the position of Figs. 1–3 and 12 and the slider may be moved upwardly and downwardly of the rows of scoops 19 to close and open the fastener incorporating the stringers 15 and 16 in conventional manner. If, however, the slider becomes caught in the stringers 15 or 16 or material secured thereto, or otherwise misaligned on or untracked from the rows of scoops 19, the pull tab or member 23 may be compressed by the application of squeezing force as indicated at F—F in Fig. 4 to release or unlock the front wing 22 from the rear wing 21 whereupon they may be brought out of longitudinal alignment or entirely separated by sliding relative movement from the position of Figs. 1, 2, 3 and 12 through the intermediate position of Figs. 4–8 to the position of Fig. 11. The slider may then be reassembled at the lower end of the fastener by slidably engaging the portion surrounding the slot 37 of the front wing in the spline provided at 28, 30, 31 and the parts reassembled through the intermediate position of Figs. 4–8 to that of Fig. 12.

As will be readily understood, where the trunnions 40, 41 of the pull member or pull tab 23 remain connected to the rear wing 21 as indicated at Figs. 8 and 9, the ease of assembly is materially increased and where this embodiment or construction is used, a two-part or unit assembly can be marketed conveniently as replacement for the conventional sliders provided in slide fasteners purchased as units or assembled to garments and other objects. It is to be noted that the resiliency of the pull tab or member 23 is such that after the parts have reached the position of Figs. 4–8, further end-wise relative movement between the front and rear wings 22, 21 will be accompanied by retentive compression of the leg portions or furcations 39 of the pull or member 23, since the portions 41, 42 on trunnions 40 and 41 engage the side walls 37 of the cap 36 (Fig. 7). When the trunnion extensions 42 and 43 become aligned with the apertures provided in the lugs 44 and 45, the furcations 39 will expand or move outwardly automatically to place the parts in the position of Figs. 1, 2, 3 and 12 wherein the wings 21 and 22 are firmly and rigidly secured in predetermined spaced alignment, both longitudinally, transversely and otherwise.

The spline connecting the wings 21 and 22 shown in Figs. 1–8, 11 and 12 as parallel with the wings or the plate-like or planar portions 25 and 33 thereof may, optionally, be inclined with respect to these portions as shown in Fig. 13 at 28a, 30a, 31a in such manner that the wings 21, 22 may be progressively spread as they are moved from their locked, normal relative position shown in Figs. 1–3 and 12, through the position of Figs. 4–8 toward full separation as shown in Fig. 11. In such constructions, the slider when caught may often be conveniently released from the objects or material in which it is caught without complete separation or detachment of the front wing 22 from the rear wing 21 or the rear wing 21 and the attached pull tab or member 23.

Because of the simplicity of the slider as shown in the drawing illustrating one preferred embodiment it is particularly adapted for formation by die-casting, molding, forging, stamping and other known methods, of materials suited to such methods of manufacture, and of course, the methods and materials may differ for the various component slider parts when desired.

It is, of course, to be understood that the above description is merely illustrative and in no wise limiting and that I desire to comprehend within my invention all modifications within the scope of the following claims.

Having thus fully described my invention, what I claim as new and desire to secure by Letters Patent is:

1. In a releasable slider of the class described, a pair of similar complementary wings, said wings being adapted to be locked in predetermined spaced longitudinal alignment to form a slider body, means slidably connecting said wings for relative longitudinal movement from said locked longitudinally aligned position to complete separation, said means comprising complementary spline forming portions integral with said wings, and means for releasably locking said wings in said longitudinally aligned position, said releasable locking means including complementary recesses in each of said wings adapted for laterally spaced substantial axial alignment in the locked longitudinally aligned position of said wings, and a pull tab member having integral spaced leg portions at its inner end terminating in a pair of normally spaced integral opposed pivot forming trunnion members, said trunnion members extending oppositely inwardly between said leg portions toward one another with their end portions normally spaced and supported for free rotation in the recesses in one of said wings and being retained in pivotal connection with said wing when said wings are completely separated, said trunnion members extending outwardly beyond said legs and the outer end portions of said trunnion members beyond said leg portions being substantially coaxial with said trunnion inner end portions and being pivotally supported by the recesses in the other wing when said wings are in longitudinal alignment.

2. The structure defined in claim 1, the outer end portions of said trunnions being supported in their supporting recesses clampingly for resisting accidental rotation thereof while being axially removable from said recesses for unlocking said slider wings for relatively slidable separation.

3. The structure defined in claim 1, said wings being relatively longitudinally slidable in one direction only from said longitudinally aligned locked position toward complete longitudinal separation, and said wings being maintained in predetermined spaced parallelism during such slidable relative movement in one direction.

4. The structure defined in claim 1, said wings being slidable endwise in one direction only from said longitudinally aligned locked relative position and said slidable relative endwise relative movement of said wings from said locked position being accompanied by increase of the spacing between said wings without affecting their relative parallelism.

5. In a releasable slider of the class described, a front wing member and a rear wing member, said wing members being adapted to be locked in predetermined spaced longitudinal alignment to form a slider body with a fastener member guide channel between said wing members, spline means connecting said wing members for relative longitudinal movement from said locked longitudinally aligned position in one direction toward complete separation, said spline means comprising complementary spline forming portions integral with said front and rear wing members, and means for releasably locking said wing members in said relatively aligned position, said releasable locking means including complementary recess forming means on said wing members laterally spaced between said wing members for laterally spaced substantial axial alignment in the locked position of said wings, and a plate-like pull tab member with integral transversely spaced leg portions at its inner end, said leg portions terminating in a pair of coaxial transversely disposed pivot-forming trunnion members, the inner portions of said trunnion members extending oppositely inwardly between said transversely spaced leg portions toward one another with their end portions normally spaced and supported for free rotation in the recesses formed on one of said wing members and the outer end portions of said trunnion members being of non-cylindrical cross-section and being clampingly engaged by the trunnion supporting recesses in said other wing member when projecting therein for yielding resistance to rotation of said trunnion members.

6. The structure defined in claim 5, said pull tab member having an integral locking projection engageable selectively with slider supporting slide fastener members when said wings are locked together, said locking member being retained against accidental escape from engagement with said fastener members by the yielding resistance to rotation of said trunnions exerted by cooperation of their non-cylindrical end portions with their supporting recesses.

7. The structure defined in claim 5, the recesses supporting the inner end portions of said trunnion members comprising a cross-bore with a continuous substantially cylindrical uninterrupted wall extending from end to end thereof.

8. The structure defined in claim 5, the recesses supporting the inner end portions of said trunnions being formed by an open transverse channel and a cooperating overlying portion of said other wing.

References Cited in the file of this patent

UNITED STATES PATENTS

| Number | Name | Date |
| --- | --- | --- |
| 2,000,415 | Pannutti | May 7, 1935 |
| 2,082,988 | Taskila | June 8, 1937 |
| 2,304,082 | Gerstman | Dec. 8, 1942 |
| 2,486,401 | Gerstman | Nov. 1, 1949 |
| 2,495,176 | Nissen | Jan. 17, 1950 |
| 2,526,653 | Gerstman | Oct. 24, 1950 |
| 2,608,734 | Beckerman | Sept. 2, 1952 |